July 21, 1953  G. H. ANDERSSON  2,645,857
SHOCKPROOF DIAL INDICATOR
Filed Dec. 19, 1950
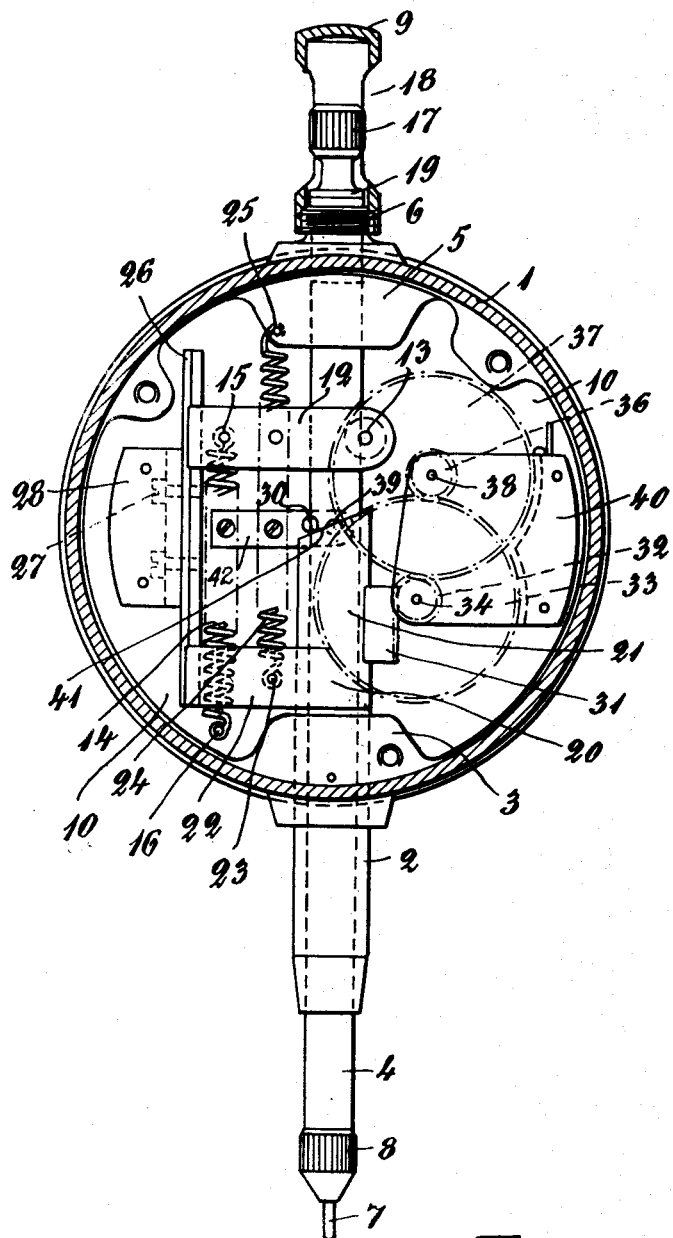
Inventor
G. H. Andersson Patented July 21, 1953

2,645,857

UNITED STATES PATENT OFFICE 2,645,857

SHOCKPROOF DIAL INDICATOR

Gustav Hugo Andersson, Halmstad, Sweden, assignor to Haldex Aktiebolag, Halmstad, Sweden, a company of Sweden Application December 19, 1950, Serial No. 201,518
In Sweden February 16, 1949

2 Claims. (Cl. 33—172)

The present invention relates to dial indicator gauges, for example, measuring instruments in which a longitudinal displacement of a measuring plunger is indicated by one or more hands arranged as in a watch, against a circular scale, and the invention particularly contemplates a simple and quick adjustment to initial position, e. g. zero position, of a dial indicator in which a hand gearing is actuated by a measuring plunger via a spring actuated intermediate piece longitudinally movable relatively to the measuring plunger and held by means of a butt member against a stop member provided on the measuring plunger.

In previously known instruments of the present kind, adjustment to zero has usually been effected by turning the scale dial. This requires special members complicating more or less the structure and handling of the gauge, such as comparatively long paths of slide and locking screws.

According to the present invention the stop member is rotatable together with the measuring plunger and slidable on an oblique end surface of the butt member so as to effect an axial displacement of the intermediate piece by rotating the plunger. By this ararngement a reliable adjustment to zero is obtained by a simple means. In a preferred embodiment the butt member is simply bevelled. The slope should be small enough to admit of unhindered adjustment to different positions and to retain the intermediate piece in the set position, and great enough to allow the adjustment of the zero position to take place within the requisite range. Therefore, the pitch of the end surface of the butt member should suitably correspond to at least one-half revolution of the hand of the gauge, preferably about a complete rotation thereof, more particularly of its most rapid hand in a gauge having several hands. For ensuring a locking of the intermediate piece in the separate positions the end surface of the butt member may be stepped or provided with depressions into which the stop member can be snapped.

The invention will be more closely described in connection with an embodiment shown in the accompanying drawing to which embodiment, however, the invention is not limited.

In the drawing, the dial indicator gauge is shown as viewed from behind and as having its rearward cover removed. Thus, the hands and measuring scales of the instrument are not visible, but they are of well known kind. At its lower part the case 1 of the gauge has a tubular lug 2 which is connected to a boss 3 on the inside of the case, and at the top a similar lug 6 and a boss 5 are provided. Through these lugs and bosses the measuring plunger 4 is movable longitudinally. The measuring plunger has, at its lower end, a measuring pin 7 and a knurled collar 8, and at its upper part a knurled knob 17 which by a flange 19 has an abutment against the lug 6. Above the knob 17 a hood 9 may be screwed onto the lug 6 in order to form, if desired, a measuring shoulder situated opposite the pin 7.

A bracket 12 is coupled to the plunger 4 by means of a screw 13 engaging a circular groove in the plunger so as to allow the plunger to be rotated. Said bracket is actuated by a spring 14, one end of which is fixed to a pin 15 in the bracket whereas its other end is fixed to a pin 16 in a supporting plate 10 of the case 1. This spring 14 tends to hold the measuring plunger in its bottom position in which the flange 19 abuts against the lug 6. Along the lower part of the measuring plunger within the case 1 an intermediate piece 20 is slidably arranged by means of the sleeve 21. To a pin 23 on the arm 22 of the intermediate piece a spring 24 is fastened by one of its ends, while its other end is fixed to a pin 25 on the upper boss 5, whereby the intermediate piece is yieldingly lifted upwards into contact with the abutment 30 secured to the measuring plunger and serving as a stop member. The spring bracket 12 as well as the intermediate piece 20 with the arm 22 slide in guides 26 which by means of the screws 27 are fixed to the holder 28 fastened in the case 1. The spring 14 is so much stronger than the spring 24 that the measuring plunger is normally held in its bottom position by the spring 14 against the action of the spring 24.

A toothed rack 31 is secured to the intermediate piece 20 in such a manner as to mesh with a primary pinion 32 supported on the axle 34 and fixed to a gear wheel 33, which in turn engages partly with the sleeve axle of the slow hand (not shown), partly also with the pinion 36 fixed to the gear wheel 37 and movable about the axle 38. The wheel 37 is geared through a pinion on the centre axle 39 of the rapid hand (not shown). The axles 34 and 38 are mounted in the central plate 10 in the case and the plate 40 secured therein. The axle 39 is journalled in the supporting plate 10 and in a bracket 42 secured to the plate 10.

During the measuring operation the measuring plunger 4, is pressed into the case 1 by the pressure of the object being measured upon the pin 7. The intermediate piece 20, which by means of the spring 24 is held against the stop 30, follows the movement of the plunger, said movement thus being transmitted to the hands via the gear wheels and pinions 32, 33, 36 and 37. Due to the fact that the intermediate piece 20 is free to move in relation to the measuring piston 4, the gearing will always be driven by the constant elastic forces of the spring 24 and will be independent of the force by which the measuring plunger is actuated, and thus will be protected against damage through too heavy or too sudden a blow on the measuring plunger.

The end portion of the sleeve 21 forms a butt member 41 having an oblique surface bearing against the stop pin 30 of the measuring plunger. By rotating the measuring plunger 4 about its longitudinal axis, e. g. by the aid of the collar 8 or the knob 17 which is accessible through the openings 18 in the hood 9, the sleeve 21 and the intermediate piece 20 may be axially displaced along the measuring plunger, whereby the hands (not shown) are caused to rotate by the gearing 31, 32, 33, 36 and 37. In this way, an adjustment of the initial position or setting to zero of the hands may easily be carried out.

Instead of being, as shown in the drawing, planely bevelled, the bearing surface of the butt member 41 may be stepped, at least on a part of the circumference for instance one half of the circumference, whereby different positions of the stop 30 may be better fixed. If the other part or the other half of the circumference is even, the intermediate piece 20 may be more easily displaced to its lowermost position by turning the plunger 4 in a corresponding direction and then displaced stepwise by turning the plunger in the opposite direction.

I claim:

1. A dial indicator comprising a frame, a measuring plunger slidably mounted in said frame, a spring actuating said plunger to hold the plunger in a projected position, a sleeve slidable on said plunger, a fixed guide for guiding the sleeve longitudinally of the plunger, means for rotating the plunger in said sleeve, means for transmitting the rotary movement of the plunger into a longitudinal movement of the sleeve comprising a stop member on the plunger and a butt member on said sleeve having an oblique surface for cooperation with said stop member, a spring actuating said sleeve to hold the butt member against said stop member, a pointer shaft, and a gearing for transmitting the longitudinal movement of the sleeve into a rotary movement of said pointer shaft.

2. A dial indicator as claimed in claim 1, in which the end of the sleeve adjacent to the stop member is formed into a butt member having an oblique surface for cooperation with the stop member.

GUSTAV HUGO ANDERSSON.

References Cited in the file of this patent

UNITED STATES PATENTS

| Number | Name | Date |
|---|---|---|
| 1,730,120 | Steinle | Feb. 26, 1929 |
| 2,139,251 | Aller | Dec. 6, 1938 |
| 2,178,745 | Emery | Nov. 7, 1939 |

FOREIGN PATENTS

| Number | Country | Date |
|---|---|---|
| 911,489 | France | July 9, 1946 |